J. M. JOHNSON.
FARE REGISTER AND COLLECTOR.
APPLICATION FILED FEB. 20, 1917.
1,295,900.
Patented Mar. 4, 1919.
8 SHEETS—SHEET 1.
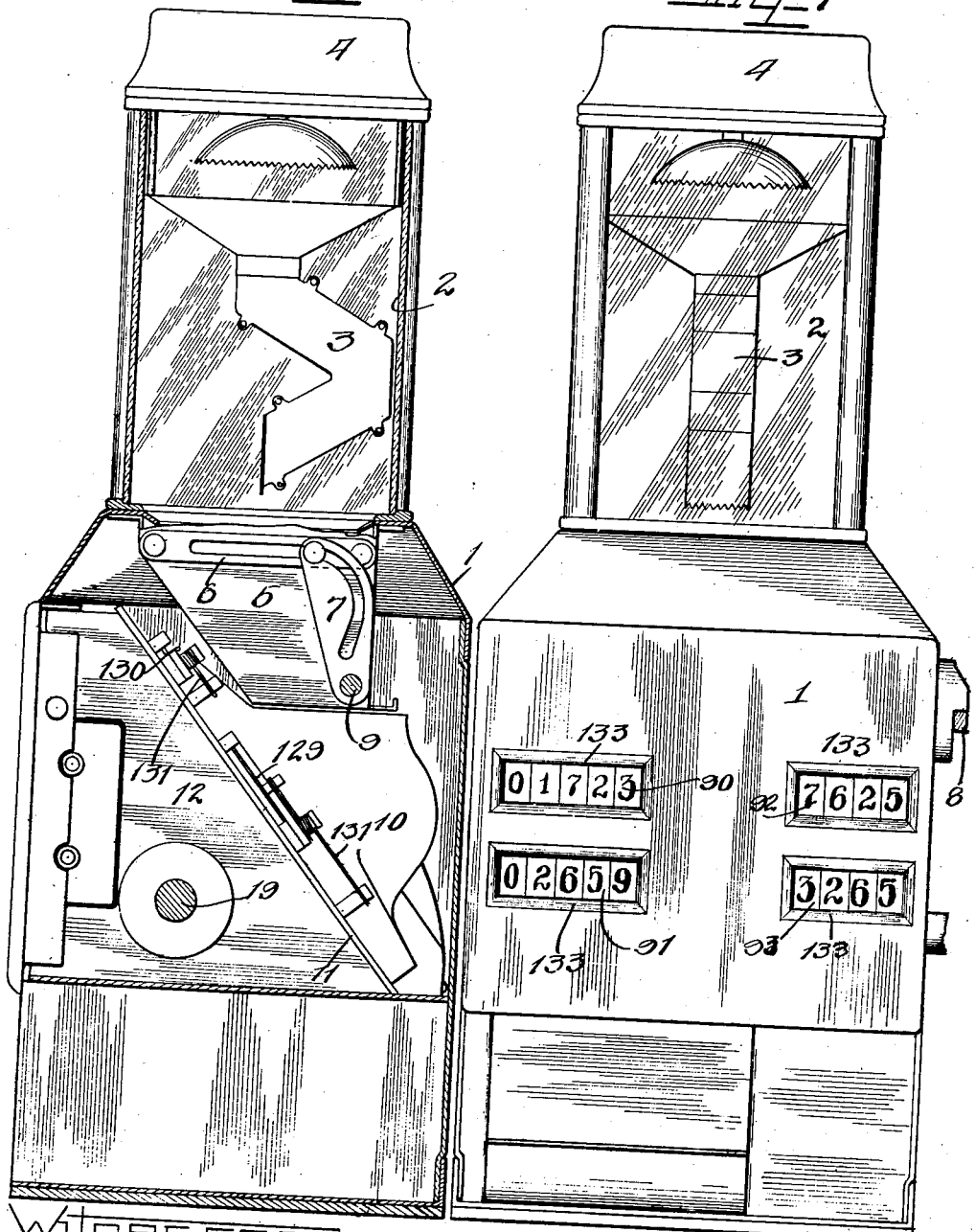

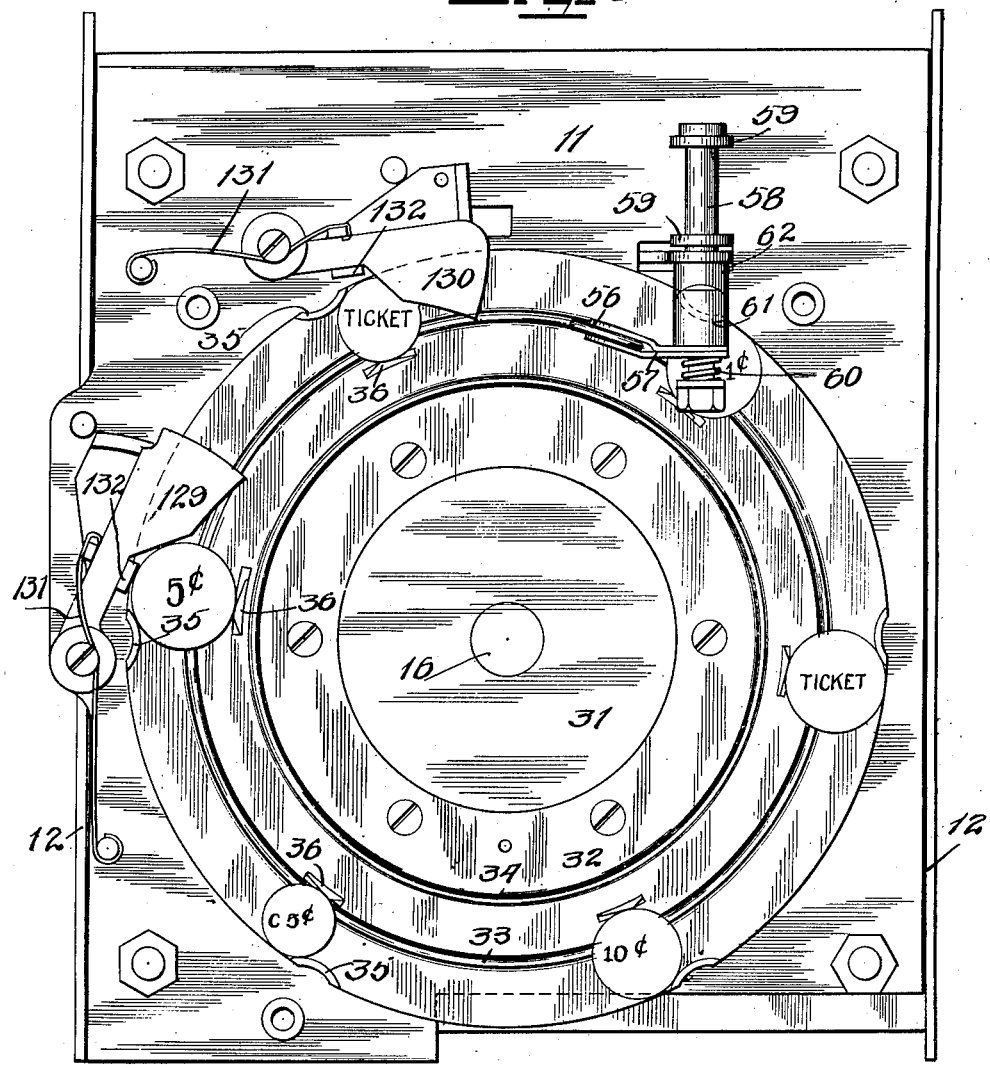

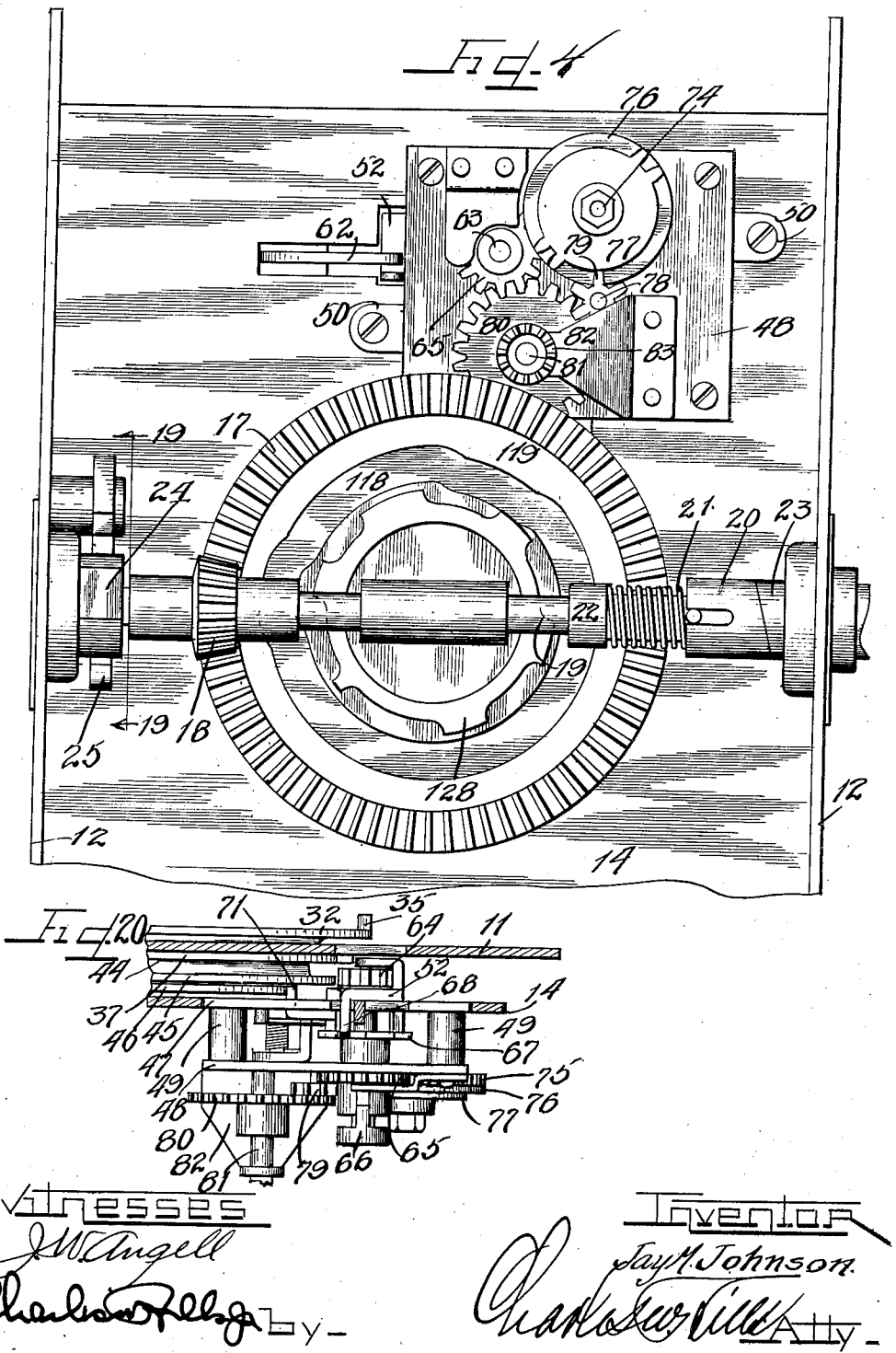

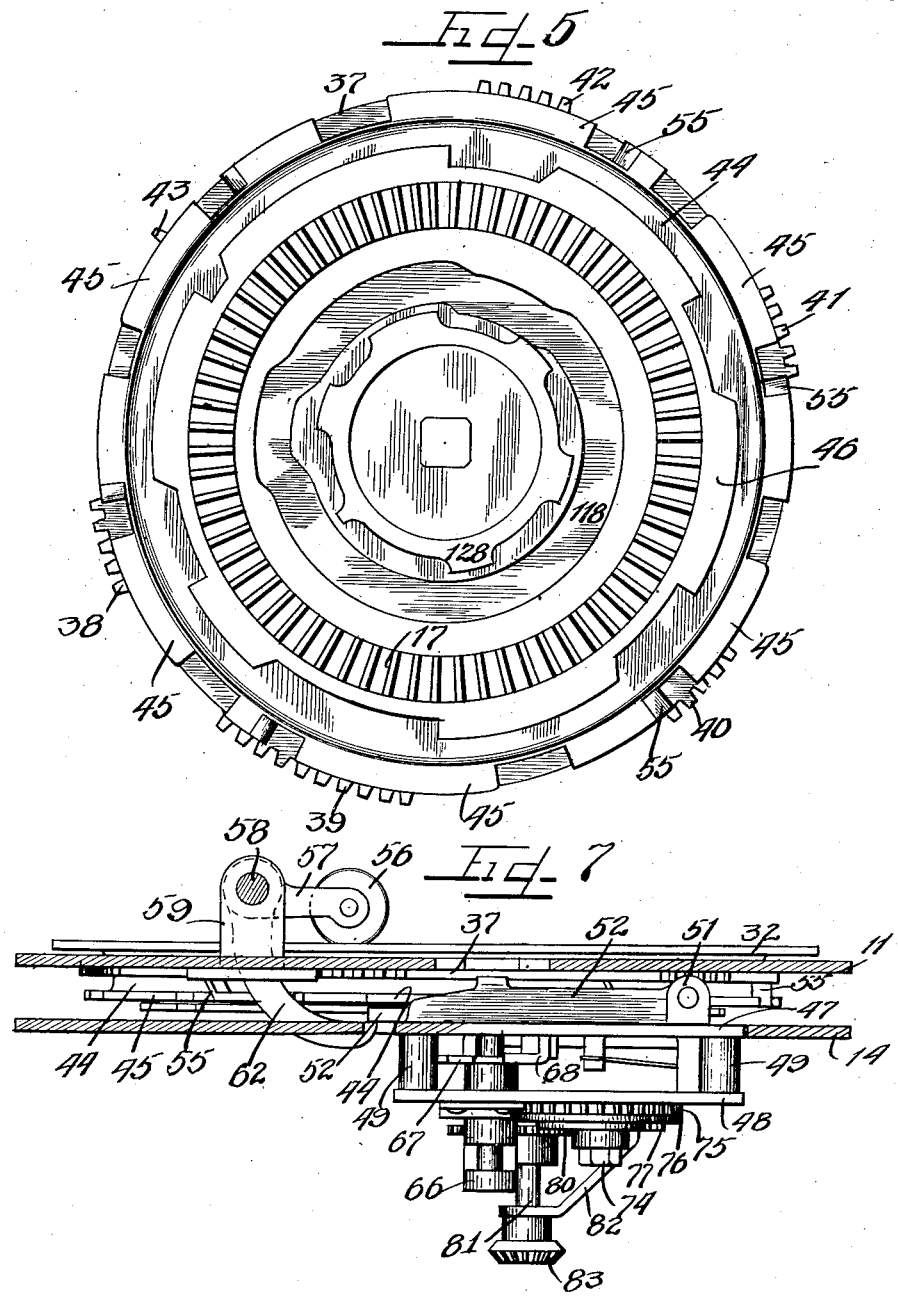

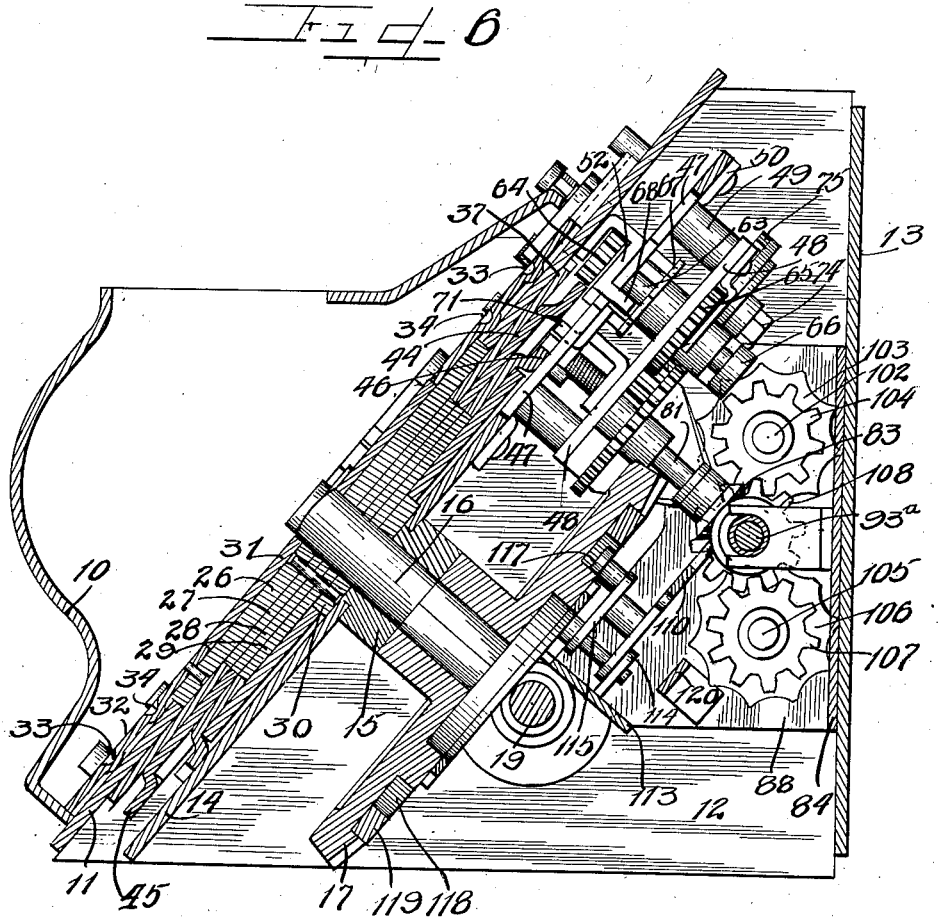

J. M. JOHNSON.
FARE REGISTER AND COLLECTOR.
APPLICATION FILED FEB. 20, 1917.

1,295,900.

Patented Mar. 4, 1919.
8 SHEETS—SHEET 6.

Witnesses
J. W. Angell
Charles Hills Jr.

Inventor
Jay M. Johnson
by Charles Hills
Atty

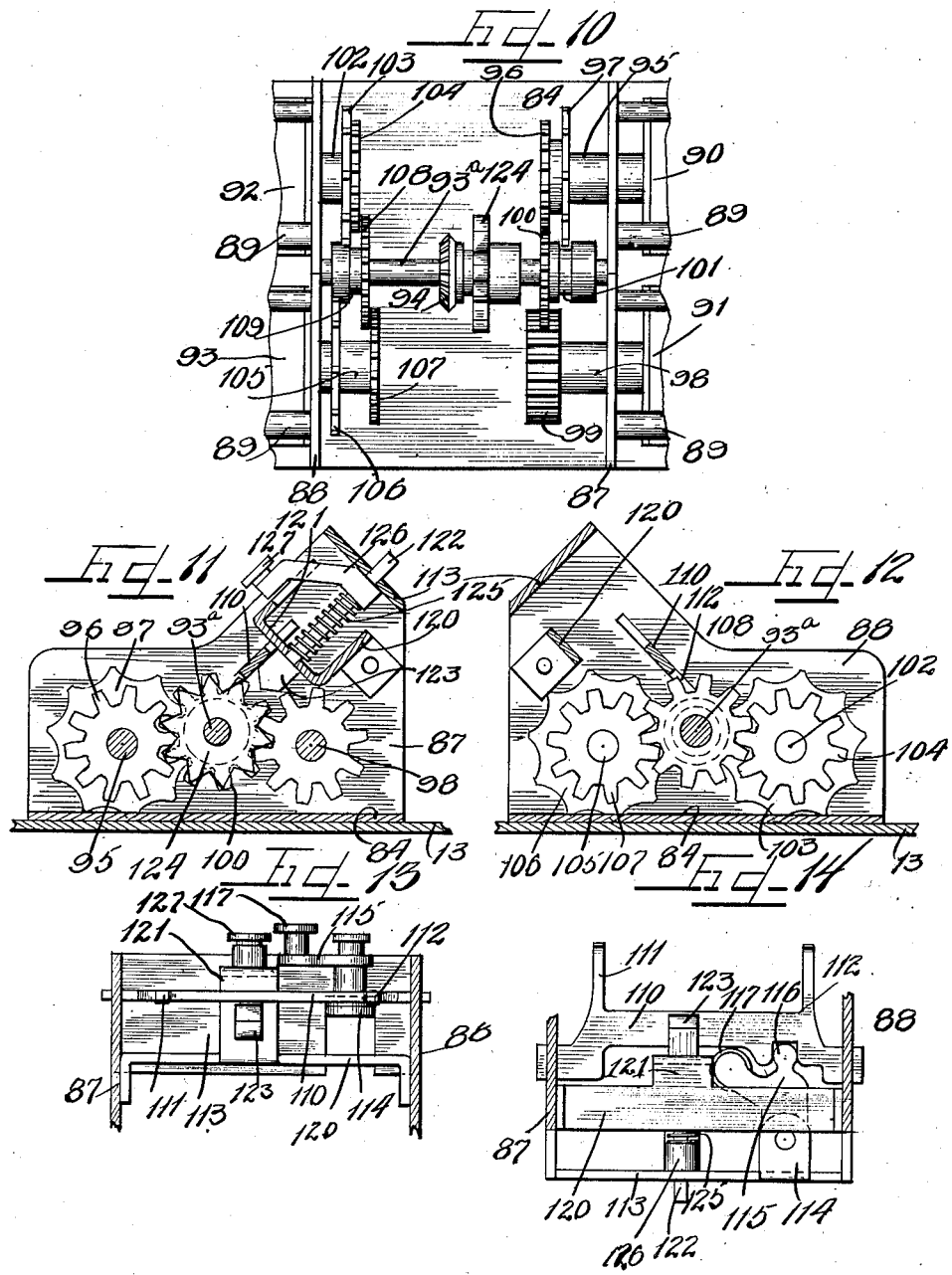

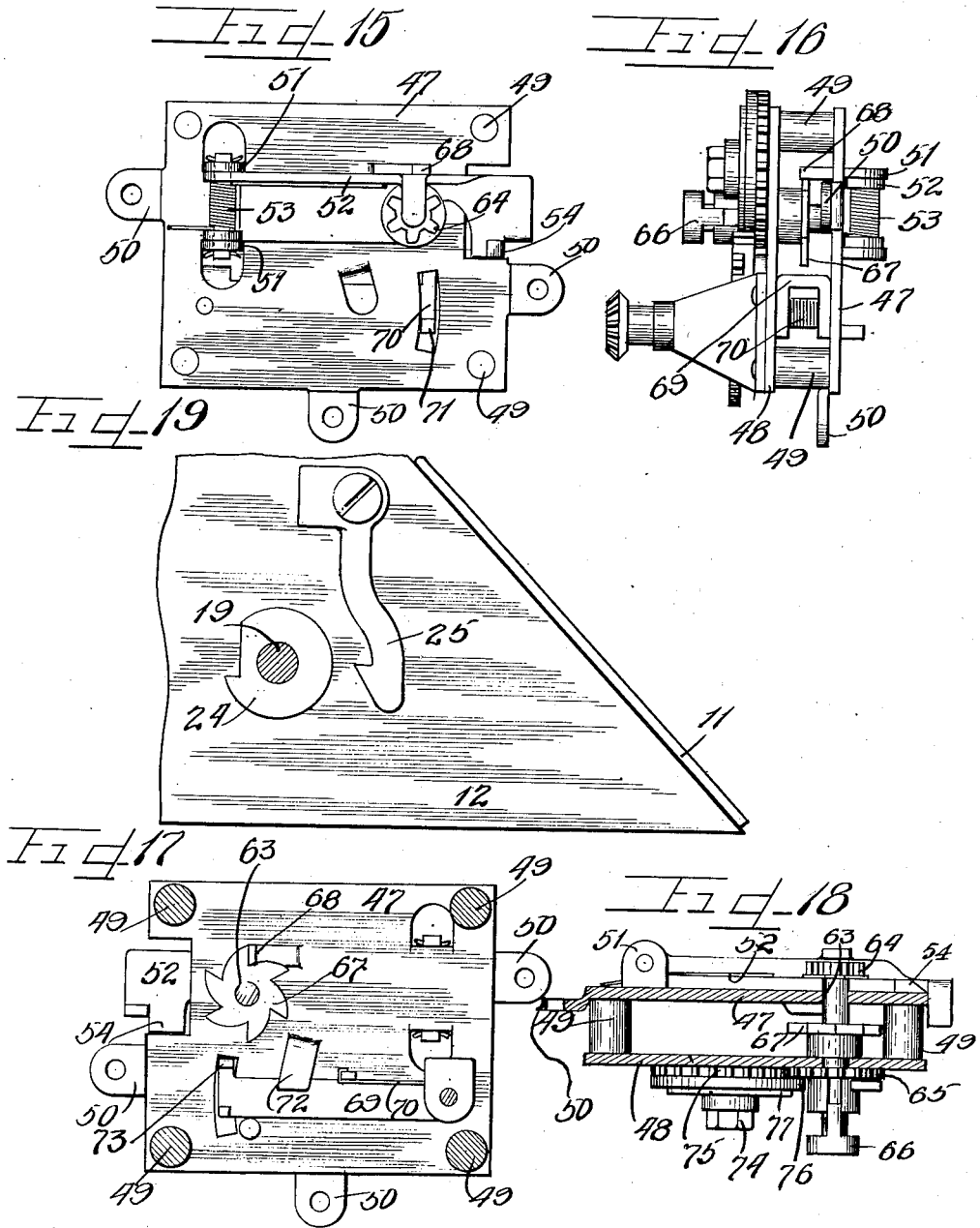

UNITED STATES PATENT OFFICE.

JAY M. JOHNSON, OF CHICAGO, ILLINOIS, ASSIGNOR, BY MESNE ASSIGNMENTS, TO JOHNSON FARE BOX COMPANY, OF CHICAGO, ILLINOIS, A CORPORATION OF NEW YORK.

FARE REGISTER AND COLLECTOR.

1,295,900.  Specification of Letters Patent.  Patented Mar. 4, 1919.

Application filed February 20, 1917. Serial No. 149,927.

*To all whom it may concern:*

Be it known that I, JAY M. JOHNSON, a citizen of the United States, and a resident of the city of Chicago, in the county of Cook and State of Illinois, have invented certain new and useful Improvements in Fare Registers and Collectors; and I do hereby declare that the following is a full, clear, and exact description of the same, reference being had to the accompanying drawings, and to the numerals of reference marked thereon, which form a part of this specification.

This invention relates to a fare collector and register adapted for use particularly upon street cars, though, of course, well adapted for use under any conditions where the collection of coins or checks is necessary, whereby the different coins or checks are counted individually and collectively to indicate the total, as well as the number of each thereof deposited into the device.

It is an object therefore of this invention to construct a coin collector and register device into which the coins are deposited, the coins passing into an inspection compartment and discharged to a counting mechanism which serves to count the different coins or checks deposited into the device by carrying the same singly upon a coin wheel into counting position, whereby mechanisms are set in operation by the carried coins to effect registration thereof, so that a count is made of each of the different denominations of coins deposited into the machine as well as a cumulative count totalizing all of the coins deposited into the machine.

It is also an object of this invention to construct a coin registering and collection machine wherein the coins are deposited into a suitable inspection compartment and then discharged to the counting mechanism falling upon an inclined coin carrying wheel, different portions of which are adapted to carry different denominations of coins, so that the coins deposited thereon are selectively moved toward counting position and operate as mechanical elements to set in operation the counting or registering mechanism and after being counted, are discharged to a common collection compartment.

It is furthermore an important object of this invention to provide a coin collection and registering machine, adapted to receive coins of different denominations deposited thereinto, wherein the coins pass through an inspection compartment prior to discharge to the counting mechanism and operate as mechanical elements on the counting mechanism to set the registering means in operation so that registers which are visible from the exterior of the machine are actuated according to the particular denomination of coins counted, thus showing the number of different coins deposited into the machine as well as the total number of all thereof.

It is finally an object of this invention to construct a coin or check fare collection register, wherein the coin and checks deposited thereinto are individually counted upon separate counters which are selectively entrained with the driving means according to the particular coin or check deposited into the machine, and with a total register to indicate the total number of coin and check fares collected within the machine.

The invention (in a preferred form) is illustrated in the drawings and hereinafter more fully described.

On the drawings:

Figure 1 is a front view of a coin or fare collection register embodying the principles of my invention.

Fig. 2 is a side view thereof with the casing broken away to show the interior mechanisms.

Fig. 3 is a front plan elevation of the counting mechanism with the receiving hopper and coin discharge chute omitted.

Fig. 4 is a rear elevational plan view of the mechanism shown in Fig. 3.

Fig. 5 is an enlarged rear elevational view of the cam and gear mechanism associated with the coin wheel of the counting mechanism.

Fig. 6 is a central vertical section taken through the counting mechanism with parts omitted and parts shown in elevation.

Fig. 7 is a top plan view partly in section of the mechanism shown in Fig. 4, with parts omitted.

Fig. 10 is a fragmentary plan view of a portion of the counter register mechanism shown in Fig. 8, with parts omitted.

Fig. 11 is a sectional detail view on line 11—11 of Fig. 8.

Fig. 12 is a sectional detail similar to Fig. 11, looking in an opposite direction, and with parts omitted.

Fig. 13 is a side edge view of a portion of the actuating mechanisms for the register device shown in Figs. 8 and 9.

Fig. 14 is a plan view of a portion of the shifting means forming a part of the register actuating mechanisms.

Fig. 15 is a detail elevational view of the drive for the register shown in Fig. 7.

Fig. 16 is an end view thereof.

Fig. 17 is a sectional detail showing a reverse view of the mechanisms shown in Fig. 15.

Fig. 18 is a central sectional detail taken through the mechanism shown in Fig. 17.

Fig. 19 is a sectional detail view taken on line 19—19 of Fig. 4.

Fig. 20 is a sectional detail showing in top plan view the mechanisms shown in Fig. 16.

As shown on the drawings:

Figure 8:
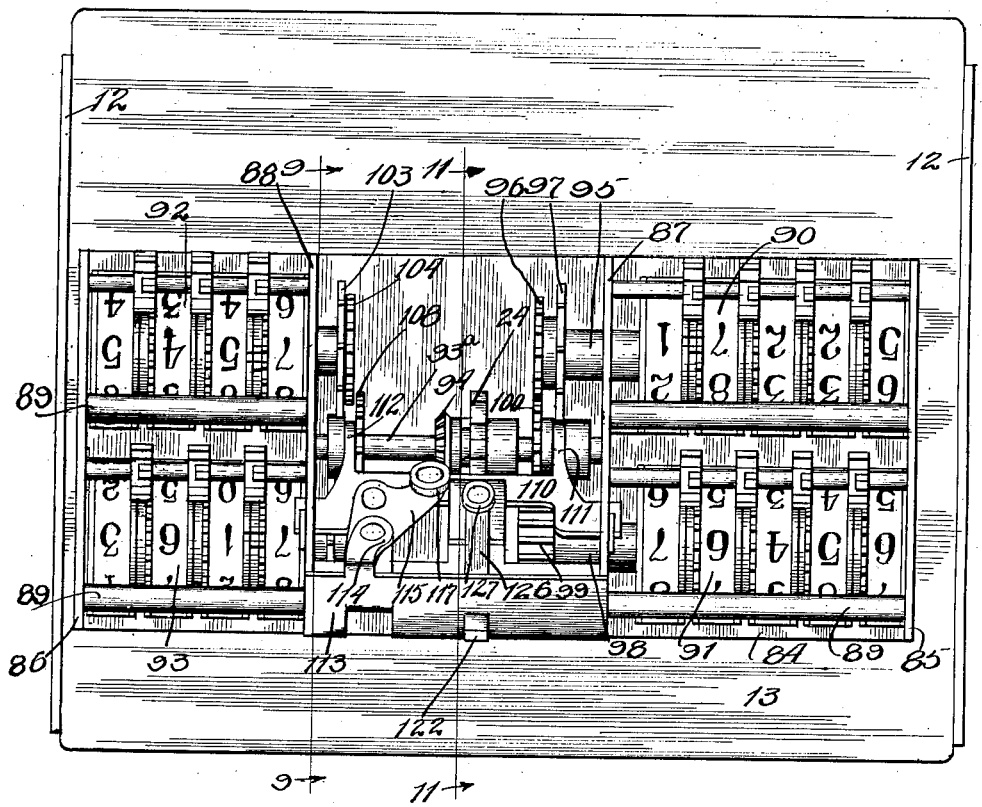
Fig. 8 is an interior face view of the register or counting mechanisms.
Figure 9:
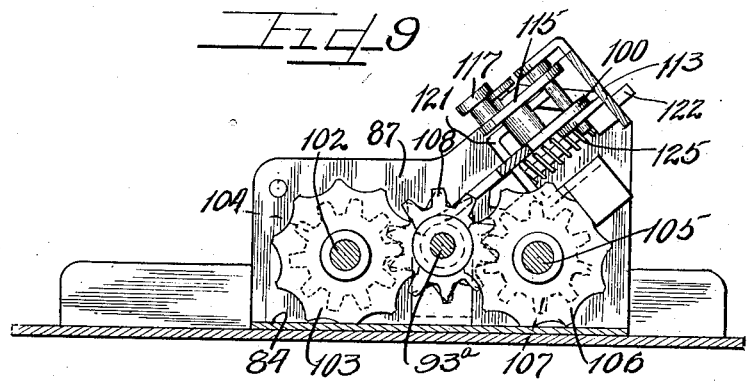
Fig. 9 is a sectional view on line 9—9 of Fig. 8.

The reference numeral 1, indicates an upright rectangular casing on the upper end of which is mounted a glass inclosed coin inspection compartment 2, with a tortuous coin tube 3, disposed therein, adapted to receive the coins for travel therethrough which are deposited through the mouth-piece 4, on the upper end of the inspection compartment. A coin chute 5, is mounted at the lower end of the inspection compartment 2, and at its upper end is provided with a dumping bottom (not shown), operated by the slotted lever 6, from a slotted crank 7, which is in turn operated by a handle 8, on the exterior of the casing 1, which is mounted on a shaft 9, on which said crank 7, is secured to discharge the coins from the inspection compartment 2, downwardly through said chute 5, into a hopper 10, of the counting mechanisms.

As clearly shown in Fig. 6, the receiving coin hopper 10, is mounted upon an inclined stationary frame plate 11, which is supported at its ends upon trapezoidal side wall frame plates 12, which are in turn connected by a vertical rear wall 13, extending therebetween. Another stationary inclined plate 14, is mounted parallel to the plate 11, slightly rearwardly thereof, as clearly shown in Fig. 6, and has secured thereto, a bearing member 15, through which a shaft 16, rotatably extends. Said shaft 16, is provided with a large bevel gear 17, which is in mesh with a small bevel pinion 18, secured upon a horizontal shaft 19, journaled between the frame plates 12. Slidably mounted upon said shaft 19, is a clutch member 20, normally impelled toward one end of said shaft by a coiled spring 21, wound about said shaft and bearing against a fixed stop 22, secured thereon. Another clutch member 23, is journaled upon said shaft 19, and the inclined face thereof contacts against the inclined face of the clutch element 20, in order to drive said shaft 19, but upon abnormal resistance being offered to the driving of said shaft, the clutch element 20, is impelled away from the clutch element 23, against the compression of the spring 21. Said clutch element 23, is connected to a handle on the exterior of the machine (not shown).

At the opposite end of said shaft 19, as clearly shown in Figs. 4 and 19, a single toothed ratchet disk 24, is secured, and suspended from a pivot at one side thereof is a pawl 25, which, if the machine is tipped to one side, for any purpose whatsoever, engages with said ratchet disk to prevent rotation of the shaft 19. Secured rigidly to one another and upon the shaft 16, are a series of superposed disks 26, 27, 28, 29 and 30, respectively, as shown in Fig. 6, with a disk 31, secured on said shaft over the disk 26, and surrounded by an annulus disk member 32, thereby forming a coin carrying wheel which is provided with two circular grooves 33 and 34, respectively, in the surface thereof. As shown in Fig. 3, a series of projections 35 and 36, are formed upon the coin carrying wheel disposed on each side of the outer groove 33, to engage coins or checks and carrying the same upwardly on the inclined wheel to counting position. The space between different pairs of projections is different to permit carrying of coins or checks of different denominations. Thus one pair of projections are adapted to carry a five cent piece, another pair a Canadian five cent piece, another pair a ten cent piece, another pair a penny, and the two remaining pairs of projections are adapted to carry coin checks, which are marked with the word "Ticket".

Said frame plate 11, is recessed so that the circular disk element 26, fits therewithin, and the coin carrying wheel rotates over the surface thereof. Surrounding said circular disk member 27, is an annular mutilated gear 37, having several groups of teeth thereon, one group of five teeth denoted by the reference numeral 38, arranged in certain relation with the projections on the coin wheel for carrying a ticket check, another group of ten teeth denoted by the reference numeral 39, arranged in certain relation with the projections for carrying a ten cent piece upon the coin wheel, another group of five teeth denoted by the reference numeral 40, arranged in certain relation with the projections for carrying the Canadian five cent piece upon the coin wheel, another group of five teeth denoted by the reference numeral 41, arranged in certain relation with the projections for carrying a five cent piece upon the coin wheel, another group of five teeth denoted by the reference numeral 42, arranged in certain relation with the projections for carrying a ticket check and a single tooth 43, arranged in certain relation with the projections for carrying a penny upon the coin wheel.

Secured upon the rear surface of the mutilated gear 37, and surrounding the circular disk member 28, is an annular cam ring 44, provided with a plurality of rearwardly bent abutments 45, on the periphery thereof, for co-action with means hereinafter described to hold a pinion in mesh with the respective groups of teeth upon the mutilated gear. A peripherally notched ring or annulus 46, is secured over the rear surface of the cam wheel 44, around the circular disk element 29, as clearly shown in Figs. 5 and 6, for a purpose hereinafter described.

Parallel frame plates 47 and 48, respectively, are connected by suitable studs 49, as shown in Figs. 17 and 18, one at each corner of said plates, and the frame plate 47, is set into a complemental recess provided therefor in the frame plate 14, and is secured thereto by off-set lugs 50, formed on said plate 47, through which screws or bolts are engaged into the frame plate 14. A pair of lugs 51, are bent outwardly from the frame plate 47, to afford parallel brackets between which a lever 52, is pivotally engaged at one of its ends, and, as shown, a spring 53, is engaged on the pivot therefor and bears against said lever and acts to hold the same normally inwardly against the plate 47. Said lever 52, is provided near its end remote from the pivot bearing therefor, with a tooth or finger 54, adapted when the lever is swung inwardly against the stress of said spring 53, to engage behind one of the abutments 45, on the cam wheel 44, and to be held therein until, by rotation of said cam wheel, one of the inclined surfaces 55, thereon, strikes the tooth 54, to thrust the same and said lever outwardly aided by the spring 53.

The inward movement of the lever 52, is effected by a moving coin carried by the coin wheel, which rides beneath a roller 56, tracking in the groove 33, said roller being journaled in an arm 57, journaled on a pintle shaft 58, which is mounted in bearings 59, on the front surface of the frame plate 11. Said lever 57, and wheel 56, are normally held impelled toward the coin wheel by a spring 60, coiled about the shaft 58. A sleeve 61, is journaled on said shaft 58, and secured to the lever 57, and also pivoted on said shaft 58, and secured to the other end of said sleeve 61, is a curved lever 62, which extends inwardly through the slotted frame plate 11, as shown in Figs. 3 and 7, and engages beneath the end of said lever 52, so that as the arm 57, is elevated by a coin, the lever 62, is moved thereby and serves to shift said lever 52, whereby the projection 54, is engaged behind one of the abutments on the cam wheel.

As shown, a shaft 63, is journaled perpendicularly through the frame plates 47 and 48, extending through the downwardly flanged portion of the lever 52, and is provided with a pinion 64, rigidly secured thereon, adapted to mesh with one of the sets of teeth on the mutilated gear 37, and to be rotated thereby to an extent dependent upon the particular coin registered. A gear wheel 65, is journaled on said shaft 63, on the inner side of the frame plate 48, and is provided with a slotted hub which is slidably engaged by a clutch member 66, secured upon the slidable shaft 63, so that driving connection between said gear 65, and the shaft 63, always exists irrespective of sliding movement of the shaft.

It is important to positively lock the shaft 63 from overthrow and for this purpose a ratchet wheel 67, is feathered on said shaft 63, between the frame plates 47 and 48, so that the shaft is slidably movable therethrough, but the wheel is rotatable with the shaft. A stop 68, is formed upon the lever 52, and said stop 68, projects rearwardly through a slot in the plate 47, an amount sufficient to engage said ratchet wheel 47, when the lever 52, is in its inner position close to the plate 47. A slot is provided in said frame plate 47, as shown in Figs. 15 and 17, and formed on a lever 69, which is spring impelled by a spring 70, is a tooth or projection 71, which extends through said slot into a position to track upon the outer periphery of the notched cam wheel 46, the notches in which are so disposed that when a set of teeth on the mutilated gear 37, are not in a position to be meshed by the small pinion 64, the tooth or projection 71, tracks on the periphery between the notches on the cam 46, so that a stop 73, is engaged with the ratchet wheel 67, to prevent rotation of the pinion shaft 63. Upon continued movement of the cam wheel 46, the notches are so disposed that when a set of teeth on the mutilated gear 37, are in a position to be meshed by the small pinion 64, the tooth or projection 71, is at the bottom of a notch in the cam wheel 46, so that the stop 68, is disengaged from the ratchet wheel 67, to permit rotation of the pinion shaft 63.

As clearly shown in Fig. 17, a lug 72, is struck from the rear surface of the frame plate 47, beneath which said lever 69, engages, to limit the upward movement thereof, and a pin or stop is also provided on the rear surface of said frame plate 47, to limit the downward movement of said lever. A stud 74, is secured to and projects from the rear surface of the frame plate 48, and journaled thereon, are rigidly connected elements comprising a gear 75, in mesh with the pinion 65, a disk 76, and rearwardly of the disk, a mutilated gear 77, having two sets of two teeth each thereon. Journaled upon a stud 78, is a small roller pinion 79, which is adapted to be driven by the respective sets of two teeth on said mutilated gear 77. Said pinion 79, is of sufficient thickness to also mesh with a large gear 80, which is secured upon a shaft 81, journaled in a bracket 82, secured on the rear surface of the frame plate 48. Secured upon the outer end of the shaft 81, is a small bevel pinion 83.

Mounted upon the front surface of the rear vertical frame plate 13, is a plate 84, and secured thereto or integral therewith at each end thereof are end plates 85 and 86, respectively, and parallel thereto and intermediate said end plates are another pair of frame plates 87 and 88, respectively. Said frame plates 85 and 87, and 86 and 88, respectively, are braced by rods 89, extending therebetween. Mounted between the frame plates 85 and 87, are two adding registers, one denoted as a whole by the reference numeral 90, and the other by the reference numeral 91, and similarly mounted between the frame plates 86 and 88, are two adding registers, one denoted by the reference numeral 92, and the other by the reference numeral 93. Inasmuch as the particular mechanisms of the adding registers are well known, a detailed description of the construction and operation thereof is not entered into. Journaled between the frame plates 87 and 88, is a shaft 93ª, which has secured thereon a bevel pinion 94, which is in mesh with and is driven by the bevel pinion 83. The drive shaft for the register 90, is denoted by the reference numeral 95, and is provided with a pinion 96, and a star wheel 97. The shaft for the register 91, is denoted by the reference numeral 98, and is provided with a wide pinion 99. Feathered upon one end of the driving shaft 93ª, is a pinion 100, which is always in mesh with the wide pinion 99, and by shifting to one side may be moved out of mesh with the pinion 96, and the hub of said pinion 100, is provided with a peripheral groove 101, which, when the pinion 100, is in mesh with the pinion 96, is registered with the star wheel 97, to permit rotation thereof with the pinion and shaft 95.

The shaft for the register 92, is denoted by the reference numeral 102, and on its end is provided with a star wheel 103, and a pinion 104. The shaft for the register 93, is denoted by the reference numeral 105, and has secured on the end thereof a star wheel 106, and a pinion 107. Feathered upon the driving shaft 93ª, is a pinion 108, adapted to be shifted either into engagement with the pinion 104 or 107, or into neutral position therebetween, and said pinion 108, is provided with an elongated hub having a peripheral groove 109, therein. It is evident by reference to Fig. 10, that when either one of the pinions 100 or 108, is shifted into driving engagement with a pinion having a star wheel associated therewith, the star wheel is permitted to rotate with the pinion, but upon being shifted out of engagement with a pinion, the star wheel is out of register with the groove in the hub of the driving pinion and bears upon the periphery of said hub and is thereby prevented from accidental rotation.

Mechanisms are provided for shifting the respective driving pinions 100 and 108, in accordance with the coin to be registered. For this purpose, a slide bar of H-shape denoted by the reference numeral 110, is slidably mounted between the frame plates 87 and 88, said slide bar having two prongs 111 and 112, one each of which engages in one of the grooves 101 and 109, respectively of the hubs of the shiftable pinions 100 and 108. Connected to and extending between the respective frame plates 87 and 88, is a plate or bar 113, having a lug 114, struck inwardly therefrom, to afford a pivot for a crank 115, having a rounded portion 116, which engages in a recess in the edge of the H-plate 110, and provided on its other arm with a roller 117. The roller 117, is adapted to track in a cam groove 118, formed in an annular insert member 119, which is recessed into the rear surface of the large bevel gear 17. The shape of the cam groove 118, is such that a swinging movement is imparted to the crank 115, to oscillate the H-shaped slide bar 110, from one side to the other to cause shifting of the respective pinions 100 and 108, to entrain the registers with the drive therefor according to which particular coin pocket on the coin wheel, as shown in Fig. 3, is moving toward counting position.

Secured between the frame plates 87 and 88, is a bar 120, the ends of which are bent inwardly for the purpose, and said bar is provided with an integral U-shaped extension 121, near the middle thereof. Slidably mounted through said U-shaped extension 121, and an aperture in the plate 113, is a rod 122, having a pointed head 123, secured on the lower end thereof, which is adapted to be thrust into interlocking engagement with a star or ratchet wheel 124, secured on the shaft 93ª, adjacent the bevel pinion 94. A coiled spring 125, is wound about said slide rod 122, and acts normally to impel the head 123, into locking engagement with the star wheel 124. Movement of said slide rod 122, however, is controlled by a rigid bracket bar 126, which is secured upon said rod 122, and extends through a slot in the U-shaped extension 121, and at its end is provided with a roller 127, which tracks upon the outer cam-shaped periphery of a ring 128, secured upon the rear surface of the large bevel gear 17.

Referring now to Fig. 3, it will be seen that a pair of stripper levers 129 and 130, respectively, are pivoted upon the frame plate 11, at one side of the periphery of the coin wheel, extending thereover but spaced thereabove to permit passage of a single coin therebeneath, but in the event of two coins sticking to one another, stripping the outermost coin from the one which is properly carried in the coin pocket. Each of said strippers 129 and 130, is held thrust inwardly by a spring 131, and a stop 132, is provided for each of said stripper levers to limit the extent of movement thereof. As clearly shown in Fig. 1, view apertures 133, are provided in the walls of the casing 1, through which the numerals on the various registers 90, 91, 92 and 93, are visible.

The operation is as follows:

The coins or ticket checks are deposited in the machine through the mouth-piece 4, and drop downwardly through the tortuous passage 3, to the bottom of the inspection compartment 2, after which they are discharged by actuation of the handle 8, which operates a dumping bottom (not shown), into the hopper 10, through the chute 5. The coins which fall into the hopper 10, lie upon the inclined rotating coin wheel, and the different pairs of projections 35—36, thereon, serve to pick up the coins of different denominations such as shown in Fig. 3, carrying the same upwardly to counting position, and it is impossible for any one pair of projections 35—36 to properly carry a coin other than that for which the same are intended. The coins so carried, pass beneath the small roller or wheel 56, which is elevated out of its groove to roll over the coin, thus swinging the lever 62, which in turn swings the lever 52, outwardly as shown in Fig. 7, so that the pinion 64, shown in Figs. 6 and 18, is shifted into mesh with the mutilated gear 37, which rotates with the coin wheel. The different groups of teeth on said mutilated gear as shown in Fig. 5, are in corresponding relation to the different pairs of coin carrying projections 35 and 36, so that the proper number of teeth or group of teeth are in position to operate the pinion 64, for that particular coin which has elevated the lever 57. The pinion 64, is held in mesh with the teeth on the mutilated gear for the time being by one of the abutments 45, on the cam wheel 44, inasmuch as the tooth or projection 54, on said lever 52, has been shifted behind one of said abutments when said lever and pinion were first initially shifted by the arm 62. After the group of teeth on the mutilated gear rotate out of mesh with the pinion 64, an inclined surface 55, on the cam wheel 44 strikes the tooth 54, to move the same together with said lever 52, back to initial position so that the pinion is withdrawn out of possible mesh with the next approaching group of teeth on the mutilated gear, unless again properly shifted into engagement therewith by a coin on the coin wheel.

In order to prevent accidental rotation of the pinion 64, and its shaft 63, a ratchet wheel 67, is feathered on said shaft 63, as shown in Fig. 17, and a stop 68, formed upon the lever 52, is normally in the position to prevent the rotation of the ratchet wheel 67, but when shifted to shift the pinion 64, and shaft 63, said stop is moved away from said ratchet wheel 67, thus permitting rotation thereof. Furthermore, another positive stop mechanism to prevent accidental rotation of the shaft 63, is provided comprising a stop 73, formed on the lever 69, which, when the pinion 64, is out of mesh with the mutilated gear, is held thrust upwardly due to the engagement of the tooth 71, on said lever 69, upon the outer periphery of the notched wheel 46, but coincident with the shifting of the shaft 63, and its pinion into an operating relation with the mutilated gear, the tooth 71, rides downwardly into a notch of said wheel 46, so that the stop 73, is withdrawn out of stop position with the ratchet wheel 67.

When the shaft 63, is driven due to a meshing of the pinion 64, with the mutilated gear, the gear 65, on the rear end of said shaft 63, is likewise driven and serves to drive the large gear 75, and, of course, the disk 76, and mutilated gear 77, rotate therewith. Said mutilated gear 77, in its rotation every half revolution causes movement of the small idler pinion 79, with which it is in mesh, which in turn drives the large gear 80, on the shaft 81, so that the bevel pinion 83, also on said shaft 81, serves to drive the bevel pinion 94, on the main register actuating shaft 93ᵃ. Slightly prior to the time that the drive is imparted to the main driving shaft 93ᵃ, the cam groove 118, will cause actuation of the crank 115, by movement of the roller 117, thereby sliding the H-plate 110, whereby the prongs 111 and 112, are moved to bring either one or the other of the gears 100 or 108, into driving relation, and the shifting movement of a gear into driving position causes movement of the groove in the hub thereof into register with the star wheel of the register gear which is to be driven. Otherwise, the star wheels which are associated with the respective gears on the register shaft bear against the hubs of the shiftable gears on the shaft 93, and thus prevent accidental operation of the register shafts. Of course, the shiftable gear 100, is always in mesh with the relatively wide gear 99, as this is connected on the total register and all coins or checks deposited into the machine are totalized on the register 91. The pointed head 123, on the end of the slidable rod 122, is normally engaged with the star wheel 124, on said main register driving shaft 93, to prevent accidental driving movement thereof, but is retracted at the instant of proper operation thereof, due to movement of the arm 126, the roller 127, on the end of which tracks upon the periphery of the notched wheel 128, which is secured upon the rear surface of the main large bevel gear 17.

I am aware that various details of construction may be varied through a wide range without departing from the principles of this invention, and I therefore do not purpose limiting the patent granted otherwise than necessitated by the prior art.

I claim as my invention:

1. In a coin counting machine of the class described, a carrying wheel adapted to carry coins and checks of different denominations, a plurality of registers, a common drive shaft therefor, means on the drive shaft adapted to be shifted into driving engagement between the shaft and a register, a cam associated with the carrying wheel controlling the shifting movement of said means, and mechanism shifted by a coin on the wheel to entrain the drive for said register main driving shaft.

2. In a machine of the class described, a coin wheel adapted to carry coins of different denominations, means adapted to be contacted by a coin on said wheel and elevated thereby, driving means associated with the coin carrying wheel, a gear mechanism adapted to be entrained with said driving means due to elevation of said means contacted by the coin, a plurality of registers, and driving means therefor constantly shifted due to movement of the coin wheel, but driven only when said gear mechanism is entrained to effect registration of a coin.

3. A machine of the class described comprising a coin carrying wheel adapted to carry coins of different denominations, driving means associated with said coin carrying wheel, gear mechanism adapted to be entrained with said driving means by a coin carried on the wheel, a plurality of registers, a drive shaft therefor normally entrained with said gear mechanism to be driven thereby, and means operated by movement of the coin wheel to entrain said register driving shaft with the proper one of the registers to effect registration of the coin.

4. In a counting machine of the class described, a coin carrying wheel adapted to carry coins of different denominations, a gear mechanism, driving means therefor associated with the coin wheel, means shiftable by a coin on the coin wheel to entrain said gear mechanism with said driving means, a plurality of registers, a common drive shaft therefor normally in driving train with said gear mechanism, and means associated with the coin wheel to cause entrainment of the proper one of said registers with said driving shaft to register a coin.

5. In a coin counting machine of the class described, a coin carrying wheel adapted to carry coins of different denominations, a driving gear associated therewith having a plurality of groups of teeth thereon arranged to correspond with the position of the carried coins on said wheel according to the denomination thereof, a gear mechanism, means adapted to be contacted by a coin on the coin carrying wheel to entrain said gear mechanism with the driving means associated with the coin wheel, a register drive normally entrained with said gear mechanism, a plurality of registers, shiftable gears forming a part of said drive adapted to be entrained with the different registers according to the denominations of coins being registered, and mechanism driven together with the coin wheel serving to effect shifting of said register driving gears to entrain the registers for registration of the coin.

6. In a machine of the class described, coin carrying means, a gear mechanism positively but intermittently driven from said coin carrying means, means adapted to be contacted by a coin carried on the coin carrying means to entrain said mechanism to be driven by the coin carrying means, a plurality of registers, a drive shaft normally entrained with said gear mechanisms, and shiftable gear means on said drive shaft operated from the coin carrying means to entrain the proper one of said registers with the drive shaft for registration of the particular coin being registered.

7. A machine of the class described, embracing a rotatable coin carrying means adapted to carry coins of different denominations, a mutilated gear associated with said means, the teeth thereof arranged in groups corresponding with the denomination of coins carried by said means, a gear mechanism, means adapted to be contacted by a coin on said means to entrain said gear mechanism with said mutilated gear, a plurality of registers, driving means therefor normally connected to be driven by said gear mechanism, a mechanism for entraining the registers with the driving means therefor, and means associated with said coin carrying means to operate said mechanism with each movement of the coin carrying means.

8. In a coin counting machine of the class described, a coin carrying means, a mutilated gear associated therewith, gear mechanism adapted to be shifted into train with said mutilated gear to be driven thereby, mechanism operated by contact with a carried coin to shift said gear mechanism into train with the mutilated gear, a plurality of registers, a drive shaft normally connected to be driven from said gear mechanism, a plurality of shiftable gears upon said drive shaft adapted when shifted to drive the registers of a cam wheel associated with said coin carrying means, and a lever operated continuously with movement thereof to shift said gears on said register drive shaft to entrain the proper gears for registration of the coin carried.

9. In a device of the class described, a coin carrying means for coins of different denominations, a gear mechanism adapted to be driven thereby, a plurality of registers, one for each denomination of coin, and one total accumulating register, driving means for said registers, shiftable gears forming a part thereof shifted continuously with movement of said coin carrying means, and a drive for said gears imparted thereto due to entrainment of the gear mechanism by a coin on the coin carrying means.

10. In a device of the class described, a selective coin carrying means, a driving gear associated therewith, a gear mechanism, a slidable gear forming a part thereof adapted to engage said driving gear, mechanism for contact with the coin on said carrying means to shift said slidable gear, a plurality of registers, driving means therefor driven by said gear mechanism, and means continuously shifted with movement of said coin carrying means to bring the proper one of said registers into train with its driving means to register a coin when said driving means is driven by said gear mechanism.

11. In a device of the class described, an inclined coin carrying wheel, projections thereon to carry different denominations of coins, an arm pivoted over said carrying wheel adapted to contact and to be elevated by a coin on said wheel, a gear mechanism, a sliding gear forming a part thereof adapted to be shifted due to movement of said arm, driving means for said slidable gear associated with the coin carrying wheel, a plurality of registers, a common drive shaft therefor normally driven by said gear mechanism, and slidable gears mounted on said drive shaft adapted to be shifted continuously with movement of said coin carrying means to entrain the proper one of said registers for register of the coin carried by the coin wheel.

12. In a machine of the class described, an inclined coin carrying means for coins of different denominations, a plurality of registers, a common drive shaft therefor, shiftable means operated by a coin on the coin carrying wheel to effect driving connection for said common drive shaft, and means shifted continuously with movement of the driving wheel to entrain the proper one of the registers with the common shaft therefor.

13. In a coin counting machine of the class described, an inclined carrying wheel, projections thereon adapted to carry coins and checks of different denominations, a plurality of registers, a common drive shaft therefor, means on the drive shaft adapted to be shifted into driving engagement between the shaft and a register, a cam associated with the carrying wheel controlling the shifting movement of said means, and mechanism shifted by a coin on the wheel to entrain the drive for said register main driving shaft.

14. In a machine of the class described, an inclined coin wheel, projections thereon adapted to carry coins of different denominations, means adapted to be contacted by a coin on said wheel and elevated thereby, driving means associated with the coin carrying wheel, a gear mechanism adapted to be entrained with said driving means due to elevation of said means contacted by the coin, a plurality of registers, and driving means therefor constantly shifted due to movement of the coin wheel, but driven only when said gear mechanism is entrained to effect registration of a coin.

15. A machine of the class described comprising an inclined coin carrying wheel to carry coins, driving means associated with said coin carrying wheel, gear mechanism adapted to be entrained with said driving means, a plurality of registers, a drive shaft therefor normally entrained with said gear mechanism to be driven thereby, and means operated by movement of the coin wheel to entrain said register driving shaft with the proper one of the registers to effect registration of the coin.

16. In a coin counting machine, mechanism for advancing coins of different denominations, a plurality of registers for independently registering the different denominations of coins and for registering the total value of all the denominations of coins, a constantly shifting mechanism adapted to selectively operate any denomination register in conjunction with the totalizing register and mechanisms operated by movement of the coin advancing mechanism to operate the constantly shifting mechanism to actuate the registers corresponding with the coins to be counted.

17. In a coin counting machine, mechanism for advancing coins of different denominations, a plurality of registers for independently registering the different denominations of coins and for registering the total value of all the denominations of coins, a constantly shifting mechanism adapted to selectively operate any denomination register in conjunction with the totalizing register, mechanisms operated by movement of the coin advancing mechanism to operate the constantly shifting mechanism to actuate the registers corresponding with the coins to be counted, and a mechanism for locking each register from movement except when connected to register the proper coin.

18. In a device of the class described a plurality of independent registers for different denominations of coins, a totalizing register, mechanism automatically adjustable for selectively driving any one of the independent registers and the totalizing register together, a coin controlled mechanism adapted to actuate said selective driving mechanism to register the value of the coins on the respective independent registers and the value of all the coins on the totalizing register and means for automatically locking the driving mechanism to prevent interruption of the driving connection during each period of operation of the registers.

19. In a device of the class described a plurality of independent denomination registers for different denominations of coins, a totalizing register, mechanism for independently connecting any denomination register with the totalizing register and mechanism controlled by the coins of different denominations to selectively actuate the proper denominational registers to register all coins of like denomination on a single register and at the same time register the total value of all the coins on the totalizing register.

20. In a device of the class described a plurality of independent registers, each for independently registering the value of the coins of one denomination thereon, a totalizing register, a mechanism for successively connecting the independent registers with the totalizing register, and a mechanism controlled by the coins to operate said register as successively connected only when coins are to be counted.

21. In a device of the class described a plurality of independent registers, each for independently registering the value of the coins of one denomination thereon, a totalizing register, a mechanism for successively connecting the independent registers with the totalizing register, a mechanism controlled by the coins to operate said registers as successively connected only when coins are to be counted, independent means for locking the registers from movement except when registering a coin, and means for locking the coin controlled means from movement except when released by the coins.

22. In a coin register a rotatable coin carrying element, a plurality of denomination registers, a totalizing register, mechanism for successively connecting the totalizing register with the various denomination registers and mechanism for actuating the registers when connected and controlled by the coin on the carrying element.

23. In a device of the class described a plurality of registers, a coin carrying element, a common drive shaft for all the registers, mechanism for continuously connecting and disconnecting the registers to operate from the drive shaft and mechanism for imparting a rotation to the register drive shaft corresponding to the value of the coin to be registered.

24. In a device of the class described a plurality of registers, a coin carrying element, a common drive shaft for all the registers, mechanism for continuously connecting and disconnecting the registers to operate from the drive shaft, mechanism for imparting a rotation to the register drive shaft corresponding to the value of the coin to be registered, and a totalizing register connected to operate from the drive shaft at all times of registration.

25. In a device of the class described a coin carrying element adapted to carry coins of different values, a register, one for each denomination of coin, a common driving mechanism adapted to selectively engage the registers, and mechanism for actuating the register so engaged if a coin is to be registered thereto and otherwise permitting the register to remain inert.

26. In a device of the class described a rotatable element for advancing coins of mixed denominations, registers for the different denominations of coins, an actuating mechanism for the registers, a mechanism controlled by the rotatable element adapted to continuously connect the registers with the actuating mechanism, one at a time, and after a stated period to disconnect the same and a mechanism normally disconnected but connected by the passing coins to impart a movement to the actuating mechanism corresponding to the value of the coins.

27. In a device of the class described a coin carrying element, a mutilated gear rotatable therewith, a driving mechanism, means operated by the coins on the carrying element to connect the driving mechanism to be actuated by the mutilated gear, a plurality of registers and a mechanism for constantly changing the connection between the driving mechanism and the registers.

28. In a device of the class described a plurality of registers, an actuating mechanism, mechanism for selectively and successively connecting the actuating mechanism to the registers, a coin carrying element for carrying coins, a member rotatable therewith and a mechanism shifted by the passing coins to connect the rotatable member and actuating mechanism for actuating the various registers to register the values of the coins carried by said coin carrying element.

29. In a device of the class described a rotatable coin carrying element, a plurality of registers, one for each denomination of coins to be registered, a mechanism controlled by the rotation of the coin carrying element for engaging and disengaging each register for each revolution of the coin carrying element, and mechanism continuously connected and disconnected for the coins on the carrying element and adapted to actuate the respective registers corresponding to the denomination of the coins as they pass.

30. In a device of the class described a rotatable coin carrying element, a plurality of registers, one for each denomination of coin to be registered, a mechanism controlled by the rotation of the coin carrying element for engaging and disengaging each register for each revolution of the coin carrying element, mechanism continuously connected and disconnected for the coins on the carrying element and adapted to actuate the respective registers corresponding to the denomination of the coins as they pass, and a totalizing register connected with each of the aforesaid registers when they register the value of the coin and disconnected therefrom at other times.

31. In a device of the class described a coin carrying wheel, a lever adapted to be actuated by coins carried on said wheel, a mutilated gear secured to and rotatable with the coin carrying wheel, a driving mechanism shifted by said lever into position to be driven by the mutilated gear, a plurality of registers, one for each denomination of coin to be counted, and mechanism for continuously connecting and disconnecting the registers to the driving mechanism to actuate the respective register each time a coin of that denomination is to be registered.

32. In a coin counting mechanism a plurality of registers, one for each denomination of coin, a register actuating mechanism constantly being connected with the different registers and thereafter disconnected therefrom, mechanism carrying a coin of the denomination to be registered past registering position at the time the drive mechanism is connected to the register of that denomination and mechanism controlled by said passing coin for driving the register actuating mechanism.

33. In a device of the class described registers for the different denominations of coin, a register actuating mechanism positively actuated to continuously and independently connect with the registers, a coin carrying element acting synchronously therewith to advance a coin past registering position of the denomination of the register connected to the actuating mechanism and mechanism imparting movement to the register actuating mechanism equivalent to the value of the passing coin.

34. In a device of the class described a plurality of registers, one for each denomination of coin, a main register drive shaft, a mechanism for connecting any register to said shaft, mechanisms for advancing coins and synchronously connecting the register of the proper denomination to said shaft, mechanism for actuating the register shaft and means actuating the same mechanism a distance dependent upon the denomination of the coin to be registered.

35. In a device of the class described registers, one for each denomination of coin to be registered, an actuating mechanism therefor, a constantly shifting mechanism for connecting the actuating mechanism with the registers, one at a time and a mechanism for moving the actuating mechanism to register the value of the coin on the respective registers.

36. In a device of the class described a constantly rotating coin carrying element, a plurality of registers, one for each denomination of coin, an intermittent actuating mechanism, and a constantly shifting mechanism for connecting each register with the actuating mechanism for each revolution of the rotating coin carrying element.

37. In a machine of the class described registers, one for each denomination of coin, a rotatable coin carrying element, mechanism controlled by the coins for actuating the registers and a mechanism for independently connecting each register with the actuating mechanism for each rotation of the coin carrying element whether a coin is to be counted or not.

38. In a machine of the class described registers, one for each denomination of coin, a rotatable coin carrying element, mechanism controlled by the coins for actuating the registers, a mechanism for independently connecting each register with the actuating mechanism for each rotation of the coin carrying element whether a coin is to be counted or not, and a totalizing register at all times connected to be actuated by the actuating mechanism for each actuation of the independent registers to register the sums of all the independent registers thereon.

39. In a device of the class described a plurality of registers, a constantly rotating coin carrying wheel, a mechanism controlled by the coin carried on the wheel adapted to be actuated an amount corresponding to the value of the coin to be registered and a constantly shifting mechanism for connecting the proper register to the aforesaid mechanism to register the value of the coin thereon, 40. In a device of the class described a plurality of independently acting registers, a main register shaft, a constantly rotating mechanism for carrying coins to registering position, a mechanism constantly actuated from the coin carrying mechanism for changing the connection between the various registers and main register shaft and a mechanism controlled by the coins passing registering position for actuating the main register shaft.

41. In a device of the class described registers for each denomination of coin, a register drive shaft, mechanism for connecting the registers to the drive shaft one at a time, and mechanisms acting synchronously therewith to advance coins to registering position and to pass the particular denomination of coin past the registering position when its respective register is connected with the register drive shaft and to thereby actuate the register drive shaft.

42. In a coin registering machine of the class described a plurality of denomination registers, a register drive shaft common to all the registers, a mechanism for successively connecting the denomination registers with the drive shaft and disconnecting the other denomination registers therefrom, a totalizing register at all times connected with the drive shaft and a mechanism controlled by the coins for actuating the register drive shaft a predetermined distance for each coin passing registering position.

43. In a coin registering machine of the class described a plurality of denomination registers, a register drive shaft common to all the registers, a mechanism for successively connecting the denomination registers with the drive shaft and disconnecting the other denomination registers therefrom, a totalizing register at all times connected with the drive shaft, a mechanism controlled by the coins for actuating the register drive shaft a predetermined distance for each coin passing registering position, independent locking mechanisms for locking each register from rotation except when connected with the register shaft and then releasing the register.

44. In a device of the class described a plurality of denomination registers, a gear wheel for each, a locking wheel for each, a common drive shaft for the registers, shifting gears thereon adapted to be shifted to connect only one of the denomination registers at a time with the shaft and a hub on each shifting gear adapted to engage the locking wheels of the respective registers when not connected with the shaft and provided with an annular passage in which the locking wheel of the register connected with the shaft engages.

45. In a device of the class described registers, one for each denomination of coin, and one for totalizing the value of the coins, a common drive shaft for all the registers, a mechanism adapted to connect any denominational register and the total register to the common drive shaft, and a mechanism controlled by passing coins for actuating the common drive shaft an amount equal to the value of each passing coin.

46. In a device of the class described a coin carrying wheel having pockets therein each adapted to receive coins of certain denominations only, registers, one for each denomination of coin, a mechanism constantly shifting and connecting each register to be actuated corresponding to the coin pocket in the wheel as the pocket is passing registering position and disconnecting each register prior to the next pocket passing registering position and an actuating mechanism controlled by the coin carried in the pockets.

47. In a device of the class described a plurality of denominational registers, a drive shaft therefor, a mechanism for continuously connecting and disconnecting each register to the shaft regardless of whether a coin is to be registered thereto or not, and a mechanism for actuating the shaft if a coin is to be registered and otherwise to permit the shaft remaining inert.

48. In a device of the class described a plurality of registers, one a totalizing register and each of the other registers representing a different denomination of coin, a common drive shaft; means connecting the totalizing register to the shaft at all times and means constantly shifting the connections between the denominational registers and the common drive shaft whereby only one denomination register is connected to the drive shaft at a time.

49. In a device of the class described registers, one for each denomination of coin, a totalizing register, a gear and star wheel on the shaft of each denomination register, a common register drive shaft, gears thereon, means for simultaneously shifting the gears into and out of mesh with the gears on the denomination register whereby only one denomination register is connected with the drive shaft at a time, a locking member movable with each of the gears on the register shaft, having a peripheral groove therein in which the star wheel of the respective register engages when the register is connected with the register shaft and each star wheel adapted to engage on the periphery of the respective locking member when not in the groove thereof.

50. In a device of the class described a plurality of independent denomination registers, a driving gear on the shaft of each register, a common drive shaft for the registers, and a plurality of constantly shifting gears successively connecting the registers with the common drive shaft.

51. In a device of the class described a plurality of independent denomination registers, a driving gear on the shaft of each register, a common drive shaft for the registers, a plurality of constantly shifting gears successively connecting the registers with the common drive shaft, a totalizing register and a gear on the shaft thereof at all times in mesh with one of the constantly shifting gears.

52. In a device of the class described registers, one for each denomination of coin, a totalizing register, a gear and star wheel on the shaft of each denomination register, a common register drive shaft, gears thereon, means for simultaneously shifting the gears into and out of mesh with the gears on the denomination register whereby only one denomination register is connected with the drive shaft at a time, a locking member movable with each of the gears on the register shaft, having a peripheral groove therein in which the star wheel of the respective register engages when the register is connected with the register shaft, the star wheel adapted to engage on the periphery of said member at all other times, a coin controlled mechanism for actuating the common drive shaft to actuate the registers connected therewith and a coin carrying wheel for advancing a coin past registering position of the denomination of the register connected with the shaft at the time said register is connected with the shaft.

53. In a machine of the class described a coin carrying wheel, a mutilated gear rotatable therewith, a cam member rotatable with the wheel, a gear shifted by the coin on the wheel to engage the proper set of teeth on the mutilated gear, a mechanism actuated by the mutilated gear, and a mechanism driven from said mechanism and constantly shifted by said cam to actuate the register corresponding to the coin to be registered.

54. In a device of the class described a shaft, a coin carrying wheel thereon having coin pockets, a member on said shaft having a plurality of sets of teeth thereon corresponding in number to the coin pockets, an adjustable gear, mechanism operated by the coins in the pockets in the wheel for shifting the gear to engage the set of teeth for that pocket, registers for different denominations of coin and mechanism selectively actuating the registers from said adjustable gear.

55. In a device of the class described a coin carrying wheel having pockets therein, a mutilated gear connected to said wheel having a set of teeth for each pocket, a plurality of registers, one for each denomination of coin carried in the pockets, and a mechanism controlled by the coin in the pockets adapted to be actuated by the appropriate set of teeth on the mutilated gear for actuating the register of the denomination corresponding to the denomination of the coin.

56. In a device of the class described a coin carrying wheel, registers, one for each denomination of coin, a mutilated gear rotatable with the coin wheel having a plurality of sets of teeth, each set of teeth having the same number of teeth adapted to register to the same register, a mechanism controlled by the position of the sets of teeth for controlling the actuation of the registers and a mechanism actuated from the appropriate set of teeth to operate the corresponding register.

57. In a device of the class described a shaft, a coin carrying wheel thereon having coin pockets therein, a mutilated gear, having a set of teeth for each pocket, a shiftable gear, means operated by the coins in the pockets to shift the gear to mesh with the corresponding set of teeth, registers, one for each denomination of coin, and a mechanism changing the connection between the registers and shiftable gear depending upon the position of the coin pockets.

58. In a machine of the class described a shaft, a coin carrying wheel thereon, a mutilated gear on said shaft, a gear adapted to mesh with the mutilated gear, means for shifting the same to mesh with the mutilated gear, means on said shaft for holding the shiftable gear in mesh with the mutilated gear for a predetermined time and then positively shifting the gear out of mesh with the mutilated gear, registers and mechanism operated from the shiftable gear for selectively operating the registers.

59. In a device of the class described a shaft, a coin carrying wheel thereon having coin pockets therein, a mutilated gear having a set of teeth for each pocket, a shiftable gear, means operated by the coins in the pockets to shift the gear to mesh with the corresponding set of teeth, registers, a mechanism driven from the shiftable gear adapted to engage any register and a cam on the shaft for controlling the register engaged by the driven mechanism.

60. In a device of the class described a shaft, a coin wheel thereon, a mutilated gear on said shaft, a plurality of cams on said shaft, registers, one for each denomination of coin, a main register shaft, means for independently connecting the registers to the shaft, mechanism operated by one of the cams for governing which of the registers is connected to the register shaft, locking means for said register shaft, means operated by another of said cams for disengaging the same prior to an actuation of the register shaft and a coin controlled mechanism actuated by the mutilated gear for actuating the register shaft.

61. In a device of the class described a shaft, a coin wheel thereon, a mutilated gear on said shaft, a plurality of cams on said shaft, registers, one for each denomination of coin, a main register shaft, means for independently connecting the registers to the shaft, mechanism operated by one of the cams for governing which of the registers is connected to the register shaft, locking means for said register shaft, means operated by another of said cams for disengaging the same prior to an actuation of the register shaft, a coin controlled mechanism actuated by the mutilated gear for actuating the register shaft and a total adding register at all times connected with the register shaft In testimony whereof I have hereunto subscribed my name in the presence of two subscribing witnesses.

JAY M. JOHNSON.

Witnesses:
CHARLES W. HILLS, Jr.,
EARL M. HARDINE.